US012594586B2

(12) United States Patent
von Birgelen et al.

(10) Patent No.: US 12,594,586 B2
(45) Date of Patent: Apr. 7, 2026

(54) CLEANING METHOD FOR CLEANING A FILLING MACHINE AND FILLING MACHINE FOR CARRYING OUT THE CLEANING METHOD

(71) Applicant: SIG Services AG, Neuhausen am Rheinfall (CH)

(72) Inventors: Bernd von Birgelen, Waldfeucht (DE); Johannes Hortmanns, Wegberg (DE); Sabine Knauff, Linnich (DE); Ngoc-Thinh Nguyen, Grevenbroich (DE); Frank Ott, Neuss (DE); Claus Panert, Neuss (DE); Gordon Petruschkat, Recklinghausen (DE); Michael Rösseler, Alsdorf (DE); Christoph Schröder, Waldfeucht (DE); Lars Wallentin, Hückelhoven (DE); Rene Ronneberger, Geilenkirchen (DE)

(73) Assignee: SIG Services AG, Neuhausen am Rheinfall (CH)

( * ) Notice: Subject to any disclaimer, the term of this patent is extended or adjusted under 35 U.S.C. 154(b) by 0 days.

(21) Appl. No.: 18/693,738

(22) PCT Filed: Sep. 20, 2022

(86) PCT No.: PCT/EP2022/076115
§ 371 (c)(1),
(2) Date: Mar. 20, 2024

(87) PCT Pub. No.: WO2023/041807
PCT Pub. Date: Mar. 23, 2023

(65) Prior Publication Data

US 2024/0261826 A1 Aug. 8, 2024

(30) Foreign Application Priority Data

Sep. 20, 2021 (DE) ..................... 10 2021 124 219.3

(51) Int. Cl.
*B08B 3/08* (2006.01)
*B08B 5/00* (2006.01)
(Continued)

(52) U.S. Cl.
CPC .................. *B08B 3/08* (2013.01); *B08B 5/00* (2013.01); *B65B 37/02* (2013.01); *B65B 39/007* (2013.01);
(Continued)

(58) Field of Classification Search
CPC .. B08B 3/08; B08B 5/00; B08B 3/024; B65B 37/02; B65B 39/007; B65B 43/52;
(Continued)

(56) References Cited

U.S. PATENT DOCUMENTS 4,989,392 A 2/1991 Lindgren et al.
6,226,960 B1 5/2001 Focke et al.
(Continued)

FOREIGN PATENT DOCUMENTS

CN 1245741 A 3/2000
CN 110382365 A 10/2019
(Continued)

*Primary Examiner* — Alexander Markoff
(74) *Attorney, Agent, or Firm* — The Webb Law Firm

(57) ABSTRACT

A cleaning method for cleaning a filling machine for filling at least to one side open packs with products is described and illustrated, wherein the filling machine has a transport device for transporting the at least to one side open packs through the filling machine. To ensure satisfactory cleaning results repeatably in a defined and/or shorter time, it is provided that a preceding plurality of at least to one side open packs is transported at least partially through the filling machine by a transport device and is filled with products, at least one nozzle for dispensing cleaning medium is transported at least partially through the filling machine by the transport device and cleaning medium is thereby dispensed
(Continued)

for cleaning the filling machine, and after the filling machine has been cleaned, a subsequent plurality of at least to one side open packs is transported at least partially through the filling machine by the transport device and is thereby filled with products.

17 Claims, 6 Drawing Sheets

(51) Int. Cl.

| | |
|---|---|
| ***B65B 37/02*** | (2006.01) |
| ***B65B 39/00*** | (2006.01) |
| ***B65B 43/52*** | (2006.01) |
| ***B65B 51/22*** | (2006.01) |
| ***B65B 55/10*** | (2006.01) |
| ***B65B 61/00*** | (2006.01) |

(52) U.S. Cl.
CPC ............ *B65B 43/52* (2013.01); *B65B 51/225* (2013.01); *B65B 55/10* (2013.01); *B65B 61/00* (2013.01); *B65B 2210/08* (2013.01)

(58) Field of Classification Search
CPC ....... B65B 51/225; B65B 55/10; B65B 61/00; B65B 2210/08; B65B 51/144; B65B 55/025; B65B 3/025; B65B 2210/06; B67C 3/001
See application file for complete search history.

(56) References Cited

U.S. PATENT DOCUMENTS

| | | | | |
|---|---|---|---|---|
| 11,780,627 | B2 | 10/2023 | Flörke et al. | |
| 2010/0139709 | A1 | 6/2010 | Saefkow et al. | |
| 2018/0009609 | A1 * | 1/2018 | Frohlich | B08B 9/0826 |
| 2021/0130021 | A1 * | 5/2021 | Bischoff | B65B 39/007 |

FOREIGN PATENT DOCUMENTS

| | | | |
|---|---|---|---|
| DE | 68905158 | T2 | 6/1993 |
| DE | 10244809 | * | 4/2004 |
| DE | 10244809 | A1 | 4/2004 |
| DE | 102009020629 | * | 11/2010 |
| DE | 102011102090 | A1 | 11/2012 |
| DE | 102009020629 | B4 | 4/2014 |
| DE | 102017103040 | * | 8/2018 |
| DE | 102017103040 | A1 | 8/2018 |
| DE | 102017213861 | A1 | 2/2019 |
| DE | 102017125973 | * | 3/2021 |
| EP | 374586 | * | 6/1990 |
| EP | 1403187 | * | 3/2004 |
| WO | WO 2007128282 | * | 11/2007 |
| WO | 2020169311 | A1 | 8/2020 |

* cited by examiner

CLEANING METHOD FOR CLEANING A FILLING MACHINE AND FILLING MACHINE FOR CARRYING OUT THE CLEANING METHOD

CROSS-REFERENCE TO RELATED APPLICATIONS

This application is the United States national phase of International Application No. PCT/EP2022/076115 filed Sep. 20, 2022, and claims priority to German Patent Application No. 10 2021 124 219.3 filed Sep. 20, 2021, the disclosures of which are hereby incorporated by reference in their entireties.

BACKGROUND OF THE INVENTION

Field of the Invention

The invention relates to a cleaning method for cleaning a filling machine for filling at least to one side open packs with products, wherein the filling machine has a transport device for transporting the at least to one side open packs through the filling machine. Furthermore, the invention relates to a cleaning device for cleaning a filling machine for filling at least to one side open packs with products for carrying out such a cleaning process, comprising at least one nozzle for dispensing cleaning medium in the filling machine, the cleaning device having a connection for a connection, in particular a detachable connection, to a supply line for supplying cleaning medium. In addition, the invention relates to a filling machine for filling at least to one side open packs with products, wherein the filling machine has a transport device for transporting the at least to one side open packs through the filling machine and wherein the filling machine comprises a filling outlet for filling the at least to one side open packs.

Description of Related Art

Methods for filling packs with products, in particular in the form of food products, are known in various configurations. The packs are filled with, preferably flowable, food products in a sterile or aseptic environment of a filling machine via a filling outlet.

As the food products need to have a long shelf life at room temperature once the packs have been filled, aseptic filling is essential. For this purpose, the filling machines have sterilization rooms or aseptic chambers, for example, in which the packs are sterilized and then filled and closed under sterile conditions.

In particular, packs are used that are open at the top in order to provide an opening for filling. The packs can be containers, for example cardboard composite packs, which are formed from a laminate comprising a cardboard layer and outer, in particular thermoplastic, plastic layers, such as polyethylene (PE). The cardboard gives the packs sufficient stability so that the packs can be easily handled and, for instance, stacked. The plastic layers protect the carton from moisture and the food from absorbing undesirable substances from the pack. Additional layers, such as an aluminum layer, can also be provided to prevent the diffusion of oxygen and other gases through the pack. The packings can be produced from a packing precursor, preferably in the filling machine. For example, packaging material blanks can be used as packaging precursors, which can be prefabricated as required, for example by closing longitudinal edges to form a packaging blank. Corresponding packaging blanks are typically mounted on mandrels of a so-called mandrel wheel, whereby the cross-section of the mandrels corresponds to the cross-section of the packaging blank, which initially protrudes outwards over the mandrel. This protruding area of the packaging blank is folded against the end face of the mandrel and sealed there to form a pack base or pack head.

Alternatively, the packaging material used for the packaging precursors can be unwound virtually endlessly from a roll. In the case of a packaging material blank, this the same folded at bending lines to initially form a packaging sleeve and a packaging base. By sealing the overlapping sections of the packaging material, the pack sleeve and the pack base are closed. The top of the pack initially remains open. If required, the top of the pack can also be closed first and the pack filled through the bottom, which is preferably open at the top. As this does not make any significant difference to the process of filling packs, the bottom of the pack is considered below to be the bottom of the pack that is closed and facing downwards during filling, and the top of the pack is considered to be the top of the pack that is still unclosed during filling. Whether or not the pack is subsequently turned for storage, transportation and/or sale, i.e. where the top and bottom of the finished pack are, can then basically be irrelevant.

The packs are subsequently fed into a sterilization zone of the filling machine. This is usually done by transferring the packs one after the other to the pack-holding cells of a transport device. The transport device then ensures that the packs are transported through the sterilization zone of the filling machine at a defined speed and at a defined distance from each other.

In the sterilization zone, the packs are preheated as required. For this purpose, the containers are exposed to hot sterile air. The inner surfaces of the packs and at least the head area of the outer surface of the packs are then treated with hydrogen peroxide and sterilized. The sterilized packs can then be dried with sterile air. The sterilized packs are transferred to the filling and closing zone, where they are preferably filled with a food product. The food product is particularly flowable. In a large number of cases, the food product is a beverage. The filled pack is then closed before the closed pack is transported out of the filling and closing zone via the transport device and then removed from the corresponding cells of the transport device.

In the filling and closing zone, an aseptic zone is formed by the supply of sterile filtered air. The aseptic zone refers to the actual aseptic or sterile area in the upper section of the filling and sealing zone. The aseptic chamber comprises the sterilization zone and the filling and sealing zone. The aseptic chamber can be designed in the form of a housing, with openings for feeding and removing packs. In addition, the aseptic chamber can have at least one opening at the lower end in order to draw off the atmosphere from the sterilization zone and/or the filling and closing zone. The space below the aseptic chamber is not aseptic, but this does not affect the aseptic filling of the pack.

In some filling machines, the packs are transported through the filling machine in a straight line by the transport device. Such filling machines are also known as linear machines. In other filling machines, known as rotary machines, the packs describe a more or less arc-shaped movement, which may include one or more circular arc sections.

When filling at least to one side open packs, it cannot be ruled out that the filling machines, in particular the filling and closing zone, will become increasingly contaminated over time. Regular cleaning of the filling machine is necessary to prevent contamination of the product during filling, in particular to ensure filling under sterile conditions. For this purpose, the filling process and the feeding of open on one side packs is interrupted. This ensures that there are no more open on one side packs in the filling machine prior to cleaning. The open on one side packs therefore do not hinder the cleaning process and cannot be damaged by the cleaning process. The actual cleaning is typically carried out manually while the filling machine is at a standstill. For this purpose, the filling machine is opened so that the operator of the filling machine has access to the areas of the filling machine to be cleaned.

In practice, cleaning the filling machine often takes a very long time if the operator wants to ensure that sufficient cleaning is achieved. If cleaning is carried out more quickly, however, inadequate cleaning results are sometimes achieved.

SUMMARY OF THE INVENTION

The present invention is therefore based on the object of further developing and forming the method, the cleaning device and the filling machine, respectively of the type mentioned at the beginning and described in more detail above, in such a way that satisfactory cleaning results can be ensured repeatedly in a defined and/or shorter time.

This problem is solved as described herein by a cleaning method for cleaning a filling machine for filling at least to one side open packs with products, wherein the filling machine has a transport device for transporting the at least to one side open packs by means of the filling machine,

- in which a preceding plurality of at least to one side open packs is transported at least partially through the filling machine by a transport device and is thereby filled with products,
- in which a cleaning device having at least one nozzle for dispensing cleaning medium is transported at least partially through the filling machine by the transport device and thereby dispense cleaning medium for cleaning the filling machine, and
- in which, the cleaning of the filling machine, a subsequent plurality of at least to one side open packs is transported at least partially through the filling machine by means of the transport device and is thereby filled with products.

Furthermore, the said object is solved in a cleaning device according to the general term as described herein in that the cleaning device is configured to be connected, in particular detachably, to a transport device and to be transported with the transport device at least in sections through the filling machine.

The aforementioned object is further solved in case of a filling machine according to the general term as described herein in that a cleaning device as described herein is provided, in that the connection of the cleaning device is connected to a supply line for supplying cleaning medium, in particular detachably, and in that the cleaning device is connected, in particular detachably, to the transport device and is provided such that it can be moved with the transport device.

According to the invention, the filling machine can be cleaned in an automated way and reproducibly. This means that it is reliably cleaned just as much and at the locations where the cleaning result is satisfactory. However, it is not cleaned excessively beyond this, so that the cleaning time remains manageable and more time is available for the actual filling of the packs, which are open on at least one side. To achieve this, after a plurality of at least to one side open packs have been transported through the filling machine and preferably filled, the contamination that has occurred in the process is removed with the cleaning device. For this purpose, the cleaning device has at least one nozzle with which a cleaning medium can be dispensed, for example sprayed, sprayed or atomized. By dispensing the cleaning medium, the cleaning medium reaches the areas of the filling machine to be cleaned without these areas having to come into contact with the cleaning device. So that the filling machine can be cleaned over a large area, the cleaning device is transported at least in sections through the filling machine by means of the transport device. The dispensed cleaning medium can then reach all the areas of the filling machine that require cleaning.

In order to retrofit a filling machine for carrying out a corresponding cleaning process, a cleaning device can be provided which, according to the invention, can be configured to be connected to the transport device. The cleaning device is connected to the transport device in such a way that the cleaning device can be transported at least in sections through the filling machine by means of the transport device. The direction and type of movement of the cleaning device can be specified and implemented via the transport device. If required, it is particularly useful if the cleaning device can be detachably connected to the transport device. For example, the cleaning device can be separated from the transport device again after the filling machine has been cleaned and can therefore also be removed from the filling machine if required.

To enable the cleaning device to dispense a cleaning medium in a suitable manner, a filling machine is provided so that the connection of the cleaning device is connected to a supply line via which cleaning medium can be supplied to the cleaning device and then dispensed via the at least one nozzle for cleaning the filling machine. Furthermore, the cleaning device as such is connected to the transport device, so that the cleaning device can be transported with the transport device at least in sections in the filling machine. This allows different locations of the filling machine to be cleaned reliably. It is particularly useful if the supply line is detachably connected to the connection of the cleaning device, for example via a plug and/or a quick-release fastener. This allows the connection to be made specifically for cleaning and disconnected again for the actual filling of the packs. Alternatively or additionally, it may be particularly preferable if the cleaning device itself is detachably connected to the transport device. The cleaning device can then only be connected to the transport device for cleaning and can be separated from the transport device for the actual filling of the packs, therefore removed from the filling machine as required.

To ensure that the cleaning device can be removed from the filling machine again after the filling machine has been cleaned, it is further advisable for the cleaning device to be detachably connected not only to the transport device but also to the supply line. The cleaning device connected to the transport device can be moved in the filling machine by means of the transport device. Once cleaning has been completed, the cleaning device can be disconnected from the transport device again if required, as the cleaning device is only needed again for the next cleaning step. The cleaning device therefore does not hinder the transport device from picking up further at least to one side open packs. Ultimately, it is ensured that the cleaning device cannot hinder the transportation of at least to one side open packs at least partially through the filling machine and preferably the filling of the at least to one side open packs in the filling machine. When a corresponding number of at least to one side open packs have been at least partially transported through the filling machine and, in particular, filled in the filling machine, it may be necessary to clean them again. The cleaning cycle described above can therefore be carried out again.

The method and the filling machine are not limited to the use of open to one side packs, even if in many cases open to one side packs are transferred to the transport unit of the filling machine and filled in the filling machine. In principle, however, it is also possible for the packs to have at least two openings and thus to be transferred to the transport unit of the filling machine both as open to two sides packs and as open to several sides packs and filled in the filling machine. However, it may also be preferable to transfer the packs to the transport device of the filling machine as at least open to two sides packs and to close at least one opening of the packs in the filling machine. For example, the packs can be transferred to the transport device of the filling machine as so-called pack jackets or sleeves, each with an opening at their opposite ends. One of the openings can then be closed and the pack, which is then only open on one side, can be filled through the remaining opening. Regardless of the number of original openings, all openings remaining in the filling machine after the pack has been filled can be closed so that no contaminants can enter the pack and no products can exit the pack after it has left the filling machine.

When dispensing of a cleaning medium through the nozzles is presently disclosed, this is due to the fact that the cleaning medium can be dispensed in different ways. Depending on the soiling to be removed and the cleaning medium used for this purpose, the cleaning medium can be squirted, sprayed or atomized, for example.

For the sake of clarity and to avoid unnecessary repetition, the cleaning method and the filling machine are described together below, without distinguishing in detail between the filling machine and the cleaning method. However, it is clear to the person skilled in the art from the context which features are particularly preferred with regard to the cleaning method and the filling machine.

In a first particularly preferred embodiment of the cleaning process, the cleaning device is connected to the transport device after the preceding plurality of at least to one side open packs have been filled. The cleaning device can then be used to clean the filling machine, particularly if this is not already equipped with a cleaning device. Alternatively or additionally, the cleaning device can be connected to a supply line after the preceding plurality of at least to one side open packs have been filled. If the transport device was already connected to the cleaning device beforehand, the filling machine can then be cleaned. Otherwise, the cleaning device can be connected to the transport device and the supply line before cleaning. If the cleaning device is disconnected from the transport device after the cleaning medium has been dispensed in the filling machine, the cleaning device can be used in other filling machines after the filling machine has been cleaned. However, separating the cleaning device from the transport device and/or the supply line can also prevent hindrance of subsequent processes. Alternatively or in addition to separating the cleaning device from the transport device, the cleaning device can also be separated only from the supply line. If required, the cleaning device can remain connected to the transport device when the cleaning device is separated from the supply line.

Against this background, it may be expedient if, after the cleaning device has been separated from the transport device and/or from the supply line, a subsequent plurality of at least to one side open packs are transported at least partially through the filling machine by the transport device and filled with products in the process. In this way, a high throughput of the filling machine can be achieved without this being hindered by the cleaning device and/or the supply line.

Alternatively or additionally, the preceding plurality and/or the subsequent plurality of at least to one side open packs are heated in a heating zone in the filling machine, sterilized in a sterilization zone, dried in a drying zone, filled in a filling zone and/or closed in a closing zone. The invention is particularly advantageous for filling machines of this type. Filling machines which have at least one heating zone, sterilization zone, drying zone, filling zone and/or closing zone are particularly difficult to clean, so that the possibility of increased reproducibility can be used particularly profitably here. It is therefore particularly useful if the cleaning medium for cleaning the filling machine is dispensed at least in the heating zone, the sterilization zone, the drying zone, the filling zone and/or the closing zone. If required, each of the zones mentioned can be cleaned separately in a suitable manner. Cleaning can not only be automated, at least in part, but can also be controlled by means of a predetermined cleaning program.

The above advantages are all the more achieved if the heating is carried out with at least one hot air nozzle, the sterilization with at least one sterilization agent nozzle, the drying with at least one hot air nozzle, the filling with at least one filling outlet and/or the closing with at least one ultrasonic sealing device. Corresponding nozzles or closing devices can, on the one hand, easily become soiled and, on the other hand, be easily cleaned by the cleaning device when the cleaning device is moved by means of the transport device. In this way, it can be specifically ensured that the at least one hot air nozzle, the sterilization nozzle, the filling outlet and/or the ultrasonic sealing device is wetted by the cleaning device. Appropriate wetting of the aforementioned system parts therefore leads to at least partial cleaning of the filling machine.

The cleaning process described above is also suitable for filling machines in which the preceding plurality and/or the following plurality of at least to one side open packs are transported at least partially through the filling machine in a plurality of rows arranged next to one another using the transport device. In this case, the at least to one side open packs are also regularly filled. Corresponding filling machines typically have a not inconsiderable width, so that cleaning by hand without the cleaning device described above would be difficult, time-consuming and not very reproducible.

Alternatively or additionally, the preceding plurality and/or the following plurality of at least to one side open packs can be transported at least partially in cells of a cell chain through the filling machine. This simplifies the transportation and filling of the packs, which are open on at least one side, and also enables efficient use of the cleaning device. For example, the cleaning device can be easily connected to the cell chain and moved by it if required. If the at least to one side open packs are to be transported at least partially through the filling machine in a plurality of rows arranged next to one another with the transport device in order to increase the output of the filling machine, it may be appropriate for the sake of simplicity if the cells are provided in successive rows in a direction transverse to the transport direction of the cells. This achieves a defined transport of the at least to one side open packs but requires a fairly wide filling machine. The cleaning of these packs can then be carried out in a particularly practical manner using the present cleaning method. If the rows of cells provided parallel to the transport direction of the cells are at least partially connected to form a common cell bar, this simplifies the design of the filling machine and makes it easier to install a fairly long cleaning device on the cell chain.

The use of the cleaning device can be simplified, for example, by connecting the cleaning device to at least one cell and/or at least one cell bar before use. The cleaning device mounted in this way can then be easily transported through the filling machine in the same way as a cell or a cell bar. In addition, after use, the cleaning device can simply be detached from the at least one cell and/or from the at least one cell bar in order to easily restore the filling machine to a state in which at least to one side open packs can be transported through the filling machine again and filled in the process.

Alternatively, at least one cell and/or at least one cell bar can be removed before the cleaning device is used in order to create space for mounting the cleaning device. The removed cell or the removed cell bar can thus be easily replaced by the cleaning device without causing space problems. Accordingly, after the cleaning device has been used, the cleaning device can be removed and replaced by at least one cell and/or at least one cell bar. In this way, the filling machine can be easily and reliably restored to a state in which at least to one side open packs can be transported through the filling machine and filled in the process.

If the cleaning device extends from an outer cell of a row of cells and/or a cell bar to the opposite outer cell of a row of cells and/or a cell bar, the filling machine can be reliably cleaned at least essentially over its entire width. In addition, it is also possible to clean the inside of the filling machines, for example by directing laterally arranged nozzles of the cleaning device specifically outwards for this purpose.

To improve the cleaning performance, the cleaning device can be moved not just in one direction by means of the transport device. Instead, the cleaning device can be moved by the transport device in the filling machine in the transport direction and against the transport direction. This dispenses in particular if cleaning medium is continuously dispensed during this process. Thus, the cleaning device for cleaning the filling machine can be transported at least once in the transport direction used when filling the at least to one side open packs and once against the transport direction used when filling the at least to one side open packs. If required, this can also be carried out several times, for example in order to initially soak the soiling in certain areas of the filling machine and then finally remove them from the areas in one or more subsequent cycles.

Alternatively or additionally, the cleaning performance may also be improved by pivoting the cleaning device connected to the transport device around a longitudinal axis of the cleaning device at at least one location within the filling machine for cleaning of the filling machine. For this purpose, the cleaning device can be connected to a pivoting device at the corresponding location of the cleaning device, in particular with a positive fit. However, it is also possible for the pivoting device to remain connected to the cleaning device during the adjustment of the cleaning device by means of the transport device. Nevertheless, if desired, the pivoting device can only be used to pivot the cleaning device at certain location in the filling machine. This may be the case because cleaning with nozzles pointing in different directions is only expedient at these location or because the cleaning device is first moved through the filling machine in one orientation by the transport device and then pivoted and then moved through the filling machine in another orientation.

The cleaning device can independently dispense a cleaning medium upwards, to the side and/or downwards to clean the filling machine. However, it will regularly be particularly important to dispense the cleaning medium upwards and possibly to the side, as sterile areas usually have to be created there. In many filling machines, a sterile environment cannot be maintained at the height of the transport device or below it anyway. Alternatively or additionally, the cleaning device for cleaning the filling machine can dispense at least one cleaning medium through a plurality of nozzles, whereby at least two, preferably at least four, in particular at least six nozzles have proven to be preferable in order to avoid excessive equipment costs.

For example, water and/or water mixed with a cleaning agent, in particular an alkali or an acid, can be used as the cleaning medium. In this context, it can be particularly useful if different cleaning media are used in succession in order to achieve a satisfactory cleaning result. For example, water and water mixed with a cleaning agent, in particular an alkali or an acid, can be used alternately at least once, in particular several times. In principle, it is also conceivable that the temperature, the pressure and/or the volume flow of the cleaning medium can be varied during the cleaning process.

To ensure that the filling machine is quickly available again for filling of at least to one side open packs after cleaning, the filling machine can be dried at least partially and/or in sections by blowing in air or, if required, hot air after the cleaning device has been separated from the transport device and before a subsequent plurality of at least to one side open packs are filled in the filling machine. The use of sterile air or hot air is particularly suitable here so that a sterile area of the filling machine cannot be re-contaminated by the air or hot air after cleaning. Drying can be accelerated and simplified if the air or hot air is blown out through the same nozzles of the cleaning device through which the cleaning medium was previously dispensed in the filling machine.

In a first, particularly preferred design of the cleaning device, the cleaning device is designed to be connected to a transport device in the form of a cell chain. This allows, for example, the cleaning device to be easily connected retroactively to an existing filling machine and/or transport device. It is particularly useful for such a connection and subsequent cleaning if the transport device is designed as a cell chain. In the case of a cell chain, for the sake of simplicity, it may also be useful if the cleaning device can be connected to the transport device in exchange with at least one cell of the cell chain. This is all the more the case if the cleaning device is designed to be connected to the cell chain in exchange with at least one cell bar of the cell chain. The cleaning device can then be mounted more easily and integrated more simply into the filling machine.

In order to increase the cleaning performance of the cleaning device, it may be advisable for a plurality of nozzles to be distributed along a pipe section of the cleaning device. Alternatively or additionally, the cleaning performance of the cleaning device can have a pipe section held pivotably in the cleaning device. The at least one nozzle, but in particular the plurality of nozzles, can be easily pivoted via the pivoting of the pipe section in order to improve cleaning. In principle, however, a pipe section could also be dispensed with in order to achieve pivoting of the cleaning device and/or the at least one nozzle.

In a first particularly preferred embodiment of the filling machine, a heating zone, preferably comprising a hot air nozzle for heating the at least to one side open packs, a sterilization zone, preferably comprising a sterilizing agent nozzle, for sterilizing the at least to one side open packs, a drying zone, preferably comprising a hot air nozzle, for drying the at least to one side open packs and/or a closing zone, preferably comprising an ultrasonic closing device, for closing the filled at least to one side open packs. These filling machines are preferred because they enable, for example, sterile filling of products into the open to one side open packs. However, this can lead to considerable contamination, which has different properties in different areas. The use of a cleaning process using a corresponding cleaning device can therefore lead to particularly preferred results.

For reliable and procedurally simple transportation of the at least to one side open packs through the filling machine, it may be advisable for the transportation device to have a cell chain with cells for holding the at least to one side open packs. Several rows of these cells can be provided in a direction transverse to the transport direction of the cells in order to increase the output of the filling machine. The cells can be at least partially connected in a direction transverse to the transport direction of the cells to form successive cell bars as seen in the transport direction. However, a single cell bar could also be sufficient in order to be able to replace it with the cleaning device in a single work step. In any case, the use of transport devices using a cell chain is always expedient in order to connect the cleaning device to the transport device and to move it through the filling machine by means of the transport device. The more rows of cells are provided in a direction transverse to the transport direction of the cells, the more efficient and reproducible the cleaning process can be carried out, at least as far as it is compared with corresponding manual cleaning.

The cleaning device can be installed in a particularly simple and space-saving manner if the cleaning device is connected to the transport device instead of at least one cell or at least one cell bar. The corresponding cells do not hinder the installation of the cleaning device or the dispensing of cleaning medium in the filling machine. To ensure that the cleaning device can be moved easily and reliably in the filling machine, it is alternatively or additionally advisable if the cleaning device does not extend further upwards and/or to the side than the preceding and/or subsequent cells and/or cell bars of the transport device. This prevents the cleaning device from inadvertently bumping into system parts of the filling machine while the cleaning device is being moved through the filling machine by means of the transport device. Alternatively or additionally, a pivoting device can also be provided for pivoting the cleaning device connected to the transport device. This pivoting device can be permanently connected to the cleaning device. For the sake of simplicity, it may then be advisable for the pivoting device to be moved through the filling machine with the cleaning device by means of the transport device. Nevertheless, the pivoting device can, if required, only pivot the cleaning device at certain locations of the filling machine. However, the pivoting device can also be arranged in a fixed position in the filling machine and connected to the cleaning device at certain locations of the filling machine, for example with a positive fit, in order to pivot the cleaning device at these locations. This allows cleaning to be carried out at the corresponding locations with a pivoting cleaning device. Alternatively or additionally, the cleaning device could first be transported through the filling machine in one orientation and then pivoted and transported through the filling machine in another orientation.

BRIEF DESCRIPTION OF THE DRAWINGS

In the following, the invention is explained in more detail with the aid of a drawing showing only an embodiment. The drawing shows FIG. 1A filling machine according to the invention suitable for carrying out the cleaning process according to the invention in a schematic representation, FIG. 2A-B a detail of the filling machine from FIG. 1 in the area of the transport device in a perspective view and a top view, FIG. 3*a* detail of the cleaning device of the filling machine according to the invention from FIG. 1 in a perspective view and FIG. 4A-B details of the filling machine in the area of a pivoting device from FIG. 1 in perspective views.

DESCRIPTION OF THE INVENTION

Figure 1:
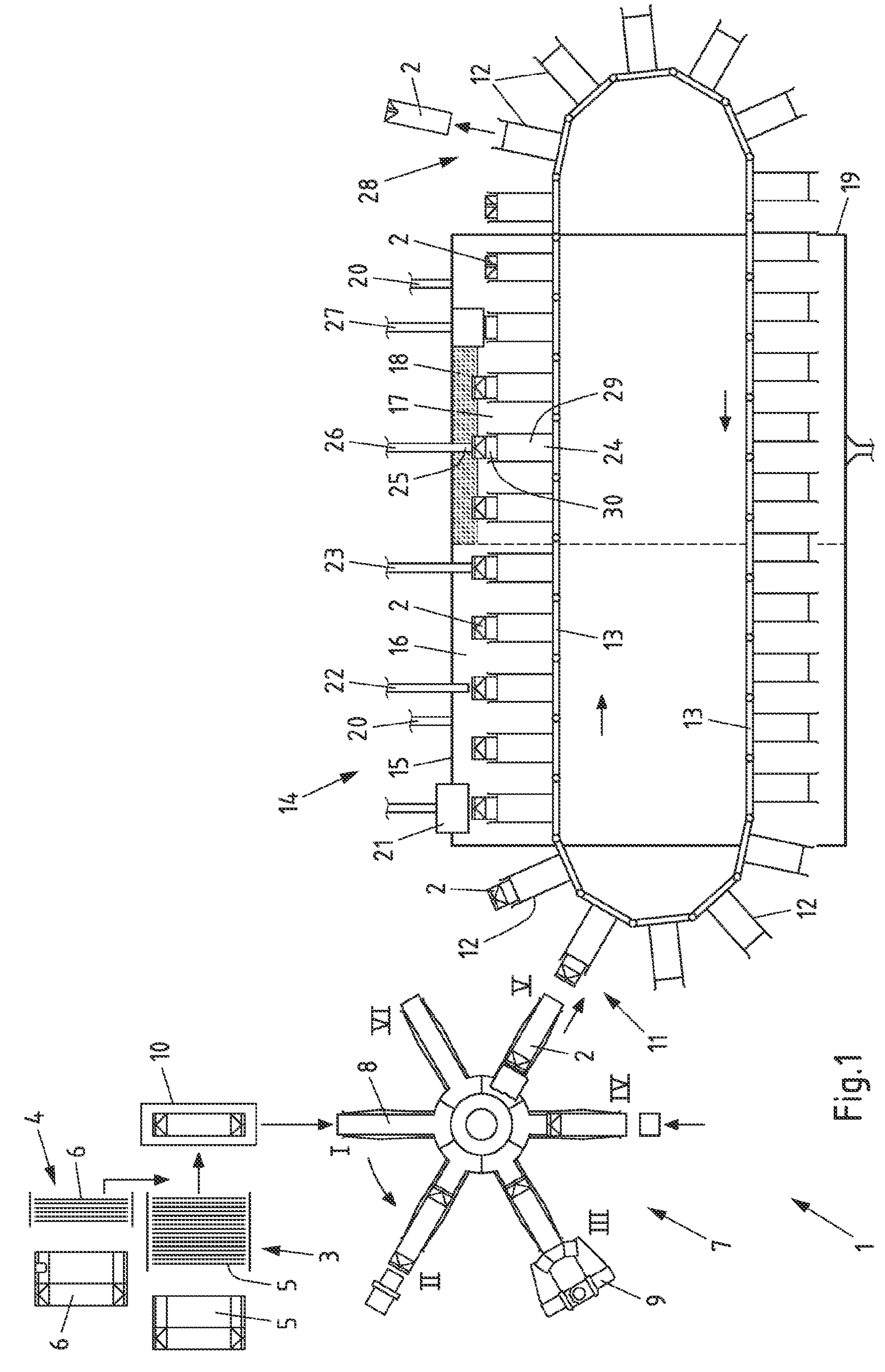

FIG. 1 shows a filling machine 1 for forming, filling and closing packs. The packs 2 are in particular cardboard composite packs made of corresponding packaging laminates with at least one cardboard layer, at least one barrier layer, for example consisting of aluminum, polyamide and/or an ethylene-vinyl alcohol, and outer layers made of a thermoplastic material, in particular polyethylene (PE). The filling machine 1 shown and preferred in this respect has two stacks 3, 4 of packaging blanks 5, 6 in the form of packaging material blanks, the longitudinal edges of which are sealed together and thus form packaging sleeves, which are held in a folded manner next to each other in the stacks 3, 4. The packaging blanks 5, 6 are unfolded by a supply device 10. In the device shown and preferred in this respect, an application device, for example in the form of an injection molding machine, can also be provided for applying, in particular injection-molding, pouring elements not shown to the packaging blanks 5, 6.

The illustrated and in this respect preferred mandrel wheel 7 has six mandrels 8 and rotates counterclockwise cyclically, i.e. in steps. In the first mandrel wheel position I, a packing blank 5, 6 is pushed onto the mandrel 8. Spring clamps, not described in detail, thereby secure the position of the packing blank 5, 6 on the mandrel 8. The mandrel wheel 7 is then rotated further in the next mandrel wheel position II, in which the base area of the packing blank 5, 6 is heated with hot air using a hot air blower, not described in detail. In the next mandrel wheel position III, the heated base area is pre-folded by a press 9 and, in the following mandrel wheel position IV, closed in the folded position by an unspecified closing device to form a base. In this way, a pack 2 closed on one side and open on one side is obtained, which is removed from the mandrel in the subsequent mandrel wheel position V and transferred in a transfer position 11 to a cell 12 of an endless transport device guided in a circle. The package 2 is partially received in the cell 12 and held there, preferably with a positive fit. The illustrated and in this respect preferred transport device 13 is a so-called cell chain. No work step is assigned in the next mandrel wheel position VI. The number of mandrel wheel positions or mandrels 8 and the processing steps provided there can deviate from the illustration in FIG. 1 and the associated description as required.

From the transfer position 11, the to one side open pack 2 is transported through a filling machine 1 with the open top area facing upwards in the associated cell 12 with the aid of the transport device 13. If required, the pack 2 could also be filled through the upward-facing base area if the downward-facing head area were closed for this purpose. The filling machine 1 has an aseptic chamber 15, which comprises a sterilization zone 16 and a filling and sealing zone 17, through which a series of packs 2 are transported one after the other. The transport direction T of the packs 2 is from left to right, as symbolized by the arrows, whereby the packs 2 do not have to be transported in a straight line, but can also be transported in at least one arc or even in a circle. The transport device 13 is not completely sterile, so that the aseptic area, in particular the aseptic zone 18, of the filling and sealing zone 17 on the transport device 13 ends at least below the cells 12. However, at least the area inside the packs 2 and above the packs 2 in the filling and sealing zone 17 is sterile. This minimum area is illustrated by the hatched aseptic zone 18 and should also be kept sterile during a product change. At the lower end of the filling and closing zone 17 and below the transport device 13, there is a collection tray 19 from which collected liquid can be drained, for example via a bottom-side drain.

In order to avoid contamination of the sterile environment, the aseptic zone 18, a flow of sterile air is preferably maintained from top to bottom in the aseptic chamber 15. For this purpose, corresponding sterile air connections 20 are provided along the aseptic chamber 15 for supplying sterile air.

In the device 1 shown, the sterilization zone 16 and the filling and closing zone 17 are separated by a curtain of sterile air, which is blown in at the top and flows downwards in an essentially laminar manner. Alternatively or additionally to the curtain, an airlock or a narrow section would also be conceivable, which just allows the containers or packs 2 to pass into the filling and closing zone 17, but at least tends to hold back the atmosphere from the sterilization zone 16.

After entering the sterilization zone 16, the packs are preheated one after the other in a heating zone by a preheating device 21 in the form of a hot air nozzle by blowing hot sterile air at them. The packs 2 are then exposed to a sterilizing agent, such as a mixture of steam, hydrogen peroxide and preferably filtered air, in a sterilization zone by means of a sterilization device 22 in the form of a sterilizing agent nozzle, in order to sterilize at least the insides of the to one side open packs 2. The packs 2 are then dried in a drying zone by being exposed to sterile air via a drying device 23 in the form of a hot air nozzle and, after the transition from the sterilization zone 16 to the filling and closing zone 17, are moved to a filling position 24 within the filling zone below a filling outlet 25 of a filling device 26. There, the packs 2 are filled one after the other, in particular with a food product. The to one side open filled packs 2 are then closed in a closing zone with a closing device 27 in the form of an ultrasonic sealing device by folding the upper area of the pack 2 and closing it. The closed packs 2 are then transported out of the aseptic chamber 15 and the filling machine 1 by means of the transport device 13. In a removal position 28, the packs 2 are removed from the cells 12 of the transport device 13. The now empty cells 12 are moved further towards the transfer position 11 by the transport device 13 in order to receive further packs 2 there.

Figure 2A:
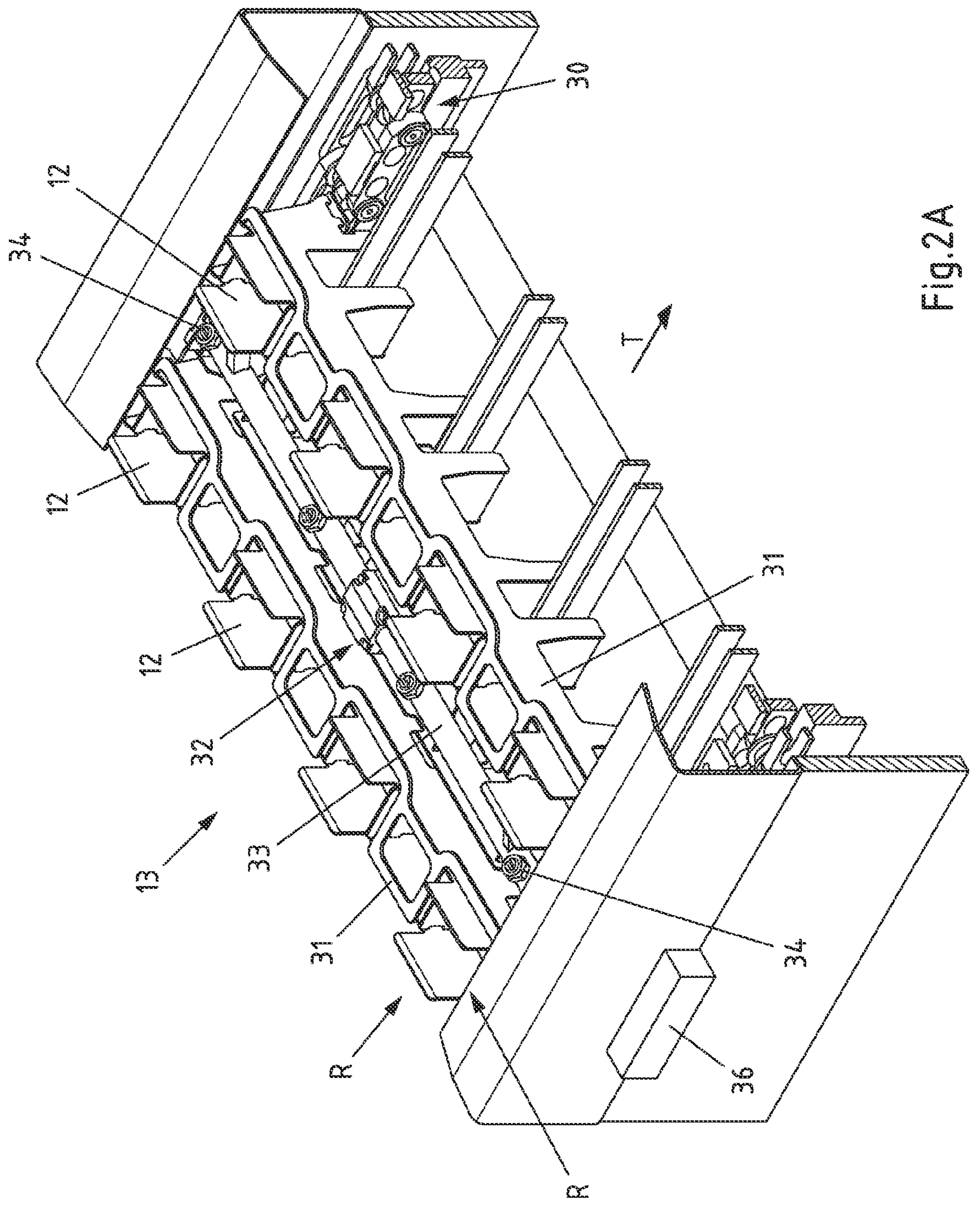
Figure 2B:
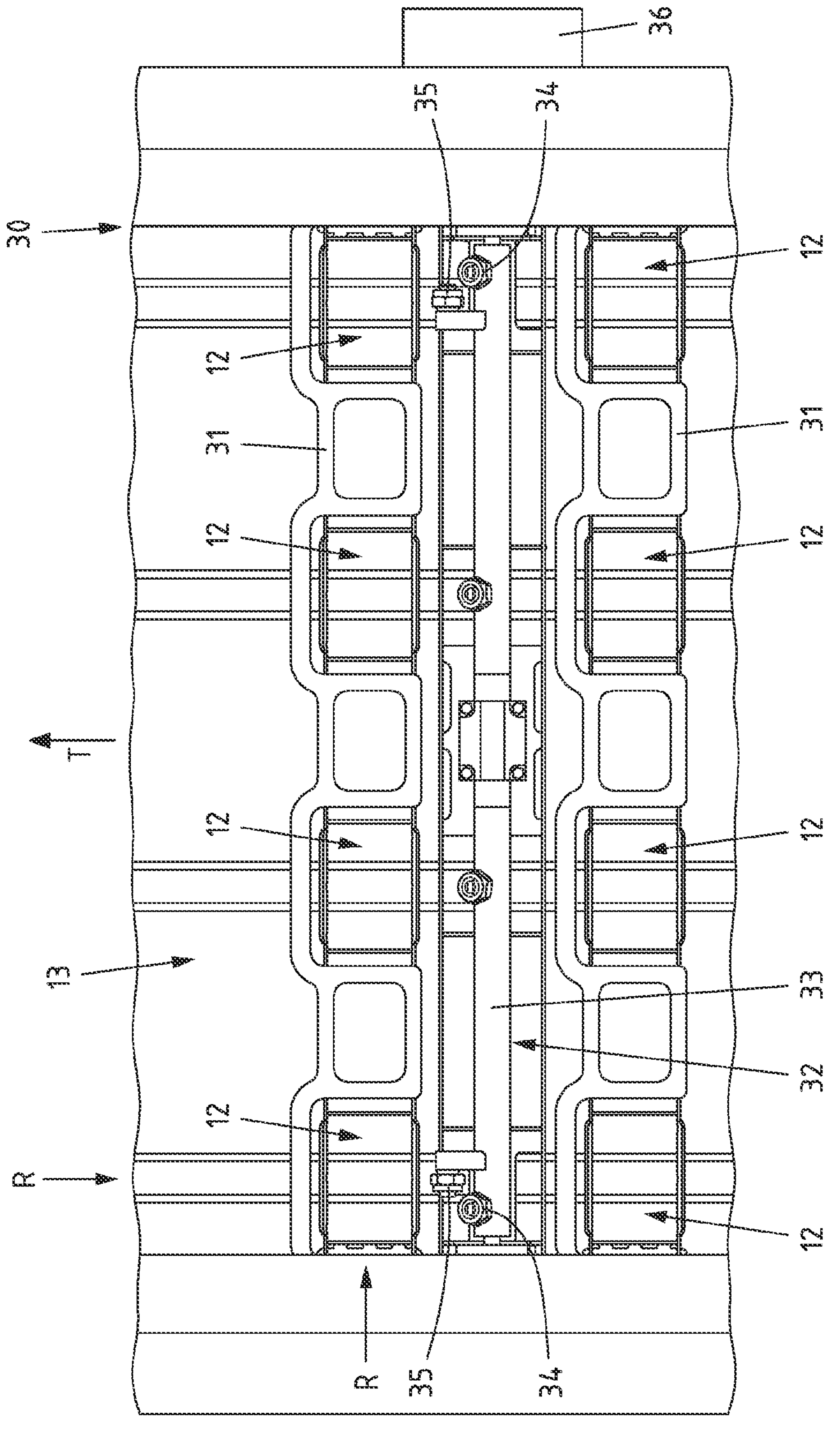

FIGS. 2A-B show a detail of the filling machine 1 of FIG. 1 in the area of the transport device 13. The transport device 13 shown is a cell chain 30 with a multitude of cells 12. Each of the cells 12 can accommodate a to one side open pack 2, so that the to one side open packs 2 are transported through the filling machine 1 by means of the cell chain 30. For this purpose, the cell chain 30 is provided in an endlessly circulating manner. The cells 12 and thus the to one side open packs 2 are transported one behind the other in the transport direction T of the transport device 13. In addition, the cells 12 and to one side open packs 2 form rows R not only in the transport direction T, but also transversely thereto. Consequently, a row of to one side open packs 2 is always heated, sterilized, dried, filled and closed jointly. Furthermore, the cells 12 arranged next to each other in a direction transverse to the transport direction T of the to one side open packs 2 are connected to each other to form cell bars 31. In reality, cell bars 31 are provided at regular intervals around the cell chain 30. In FIGS. 2A-B, however, only individual cell bars 31 are shown for the sake of clarity.

At least one such cell bar 31 has been removed from the illustrated and in this respect preferred transport device 13 and replaced by a cleaning device 32. Quick-release fasteners can be provided therefor, which enable the cell bar 31 and cleaning device 32 to be quickly exchanged for one another. The cleaning device 32 shown, which is preferred in this respect, is configured in the manner of a cell bar 31, which, however, cannot accommodate packs 2 that are open on one side in an expedient manner. Instead, the illustrated and in this respect preferred cleaning device 32 comprises a pipe section 33, which connects a total of six nozzles 34, 35, from which the cleaning device 32 can spray or otherwise dispense a cleaning medium. By dispensing, for example spraying, the cleaning medium, the filling machine 1 can be cleaned in the areas that are reached by the dispensed cleaning medium. In addition, since the cleaning device 32 is connected to the transport device 13, it can be transported through the filling machine 1 by means of the transport device 13. In this way, different areas of the filling machine 1 can be cleaned with the cleaning device 32. At one location of the filling machine 1, a pivoting device 36 is assigned to the cell chain 30 or the transport device 13, by means of which the cleaning device 32 can be pivoted to the corresponding location of the filling machine 1.

Figure 3:
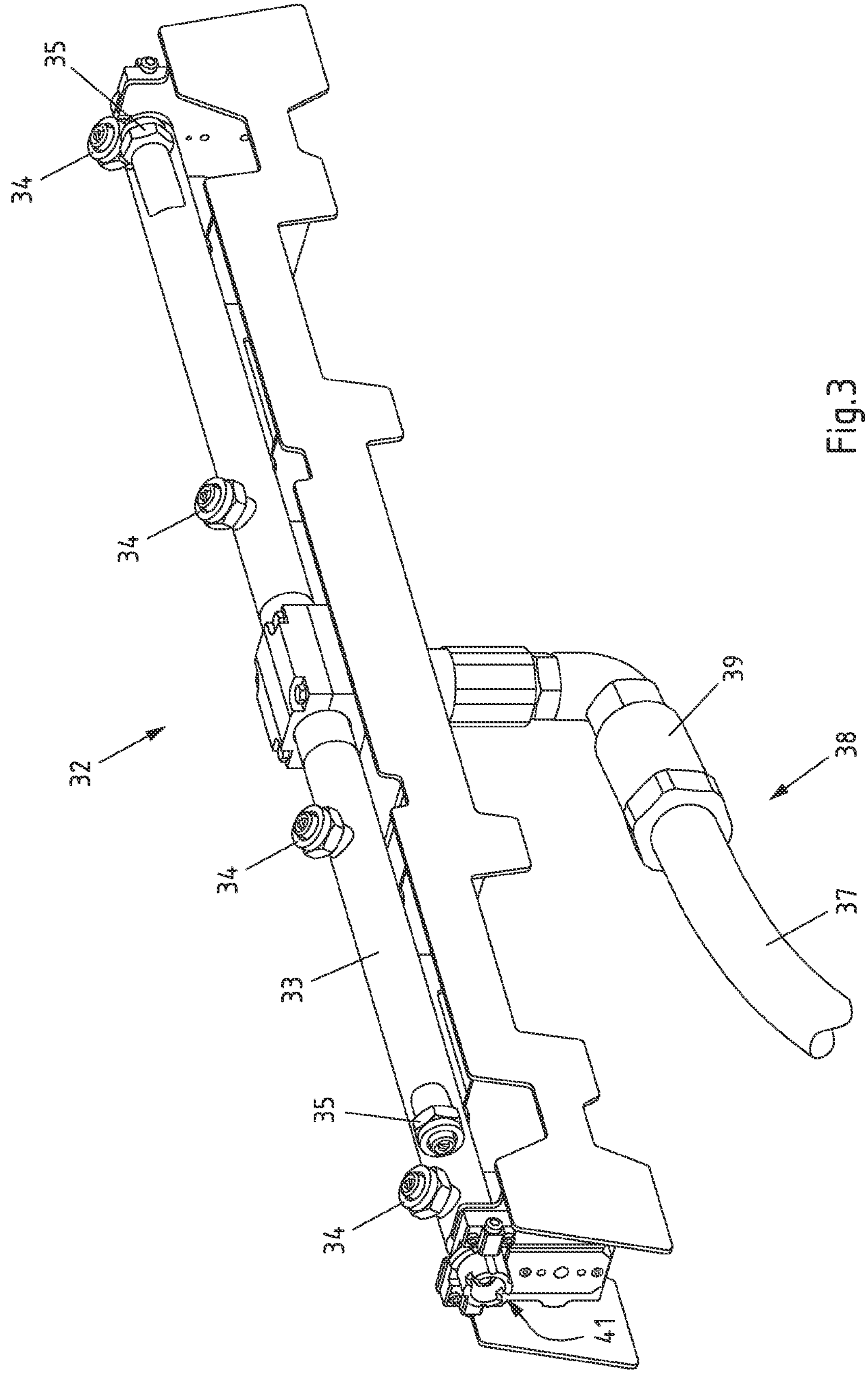

FIG. 3 shows a detail of the cleaning device 32. Here, a hose 37 in the form of a supply line 38 for cleaning medium is connected to the pipe section 33 of the cleaning device 32 via a connection for forming a plug-in closure 39. The cleaning medium is distributed via the pipe section 33 of the cleaning device 32 to a total of six nozzles 34, 35 of the cleaning device 32, the nozzles 34, 35 being arranged in a distributed manner over the pipe section 33. Of these, four nozzles 34 are provided, which are primarily directed upwards in order to clean the areas above the transport device 13 or the cell chain 30. In addition, two further nozzles 35 are provided at opposite ends, which are primarily directed outwards in order to clean the inner side walls of the filling machine 1. However, these nozzles 35 are not mandatory in every case. In addition, nozzles could also be provided that are directed downwards, but this will regularly be dispensable. A different number of nozzles 34, 35 could also be provided. It would also be conceivable to use several pipe pieces 33, respectively provided with at least one nozzle 34, 35. Finally, it is alternatively or additionally conceivable to connect several cleaning devices 32 to the cell chain 30 at different points of the transport device 13. In this way, for example, several areas of the filling machine 1 may be cleaned simultaneously, which can reduce the overall cleaning time.

Figure 4A:
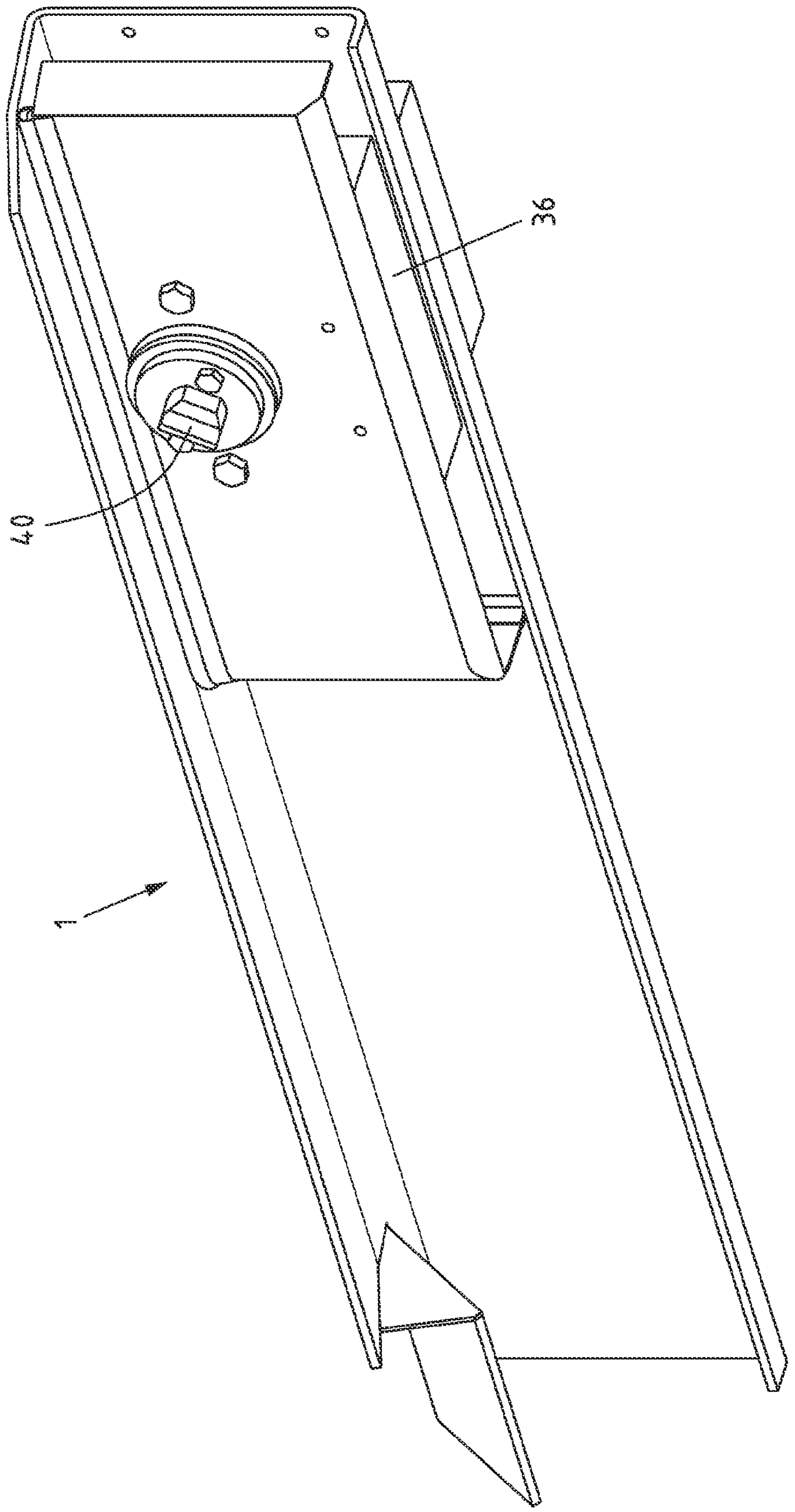

FIG. 4A shows a pivoting device 36 which is provided in a fixed position and adjacent to the cell chain 30. Here, a cam

Figure 4B:
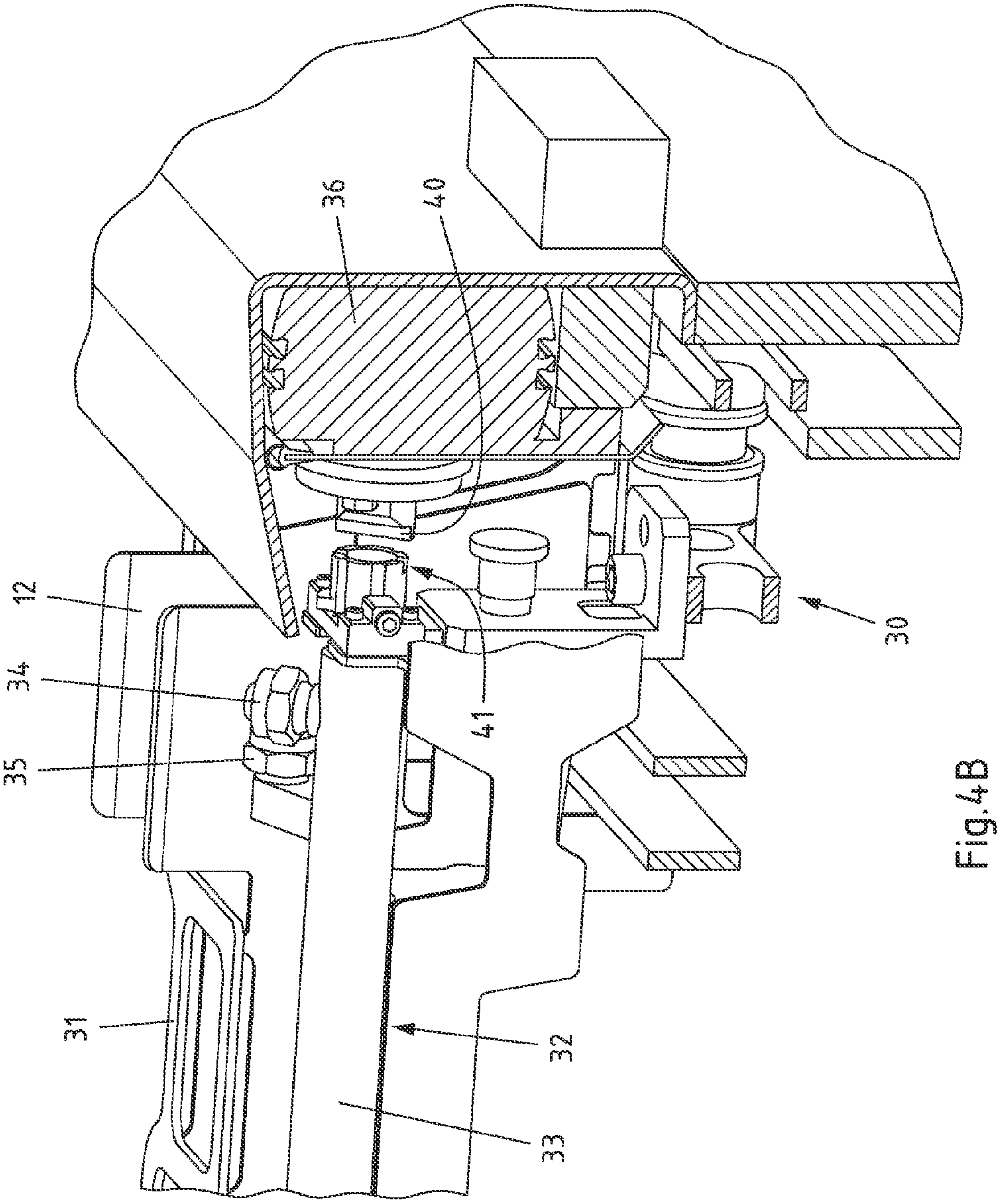

40 of the illustrated and in this respect preferred pivoting device 36 points in the direction of the cell chain 30. When the cell chain 30 has been adjusted to a position in which the cleaning device 32 is aligned in a predetermined manner with respect to the pivoting device 36, the cam 40 of the pivoting device 36 can be brought into contact with a groove 41 of the cleaning device 32. Such an opposing position of cleaning device 32 and pivoting device 36 is shown in FIG. 4B. The groove 41 of the cleaning device 32 and the cam 40 of the pivoting device 36 are not engaged. However, the cam 40 can be extended, for example pneumatically or hydraulically, in order to engage in the groove 41 of the cleaning device 32. Turning the cam 40, which can be done pneumatically or hydraulically, for example, then causes the cleaning device 32 to turn or pivot. The cam 40 can then be pivoted back again or remain in the pivoted position. If the cam 40 is then retracted again so that it is no longer engaged with the groove 41, the cleaning device 32 can be transported further through the filling machine 1 in the pivoted orientation. Alternatively, this can also take place only when the cleaning device 32 has been pivoted back into the initial orientation by means of the cam 40. In this context, it is understood that the cam 40 and the groove 41 can also be designed differently than shown. It is also possible that the cleaning device 32 has a cam 40 and the pivoting device 36 has a groove 41.

FIG. 4B further shows a quick-release fastener 42 between the cell chain 30 and the cleaning device 32. After the filling machine 1 has been cleaned by the cleaning device 32, the cleaning device 32 can be removed by pulling on a spring-loaded locking bolt 43. This disengages the cleaning device 32 and the cell chain 30 in the area of the quick-release fastener 42, so that the cleaning device 32 can be lifted off and replaced by a cell bar 31 for holding to one side open packs 2. To connect the cell bar 31 to the cell chain 30, a corresponding spring-loaded locking bolt of the cell bar 31 is pulled out against the spring force and the cell bar 31 is inserted into the cell chain 30. The locking bolt of the cell bar 31 is then released and the locking bolt engages with the cell chain 30 due to the restoring force of the associated spring.

LIST OF REFERENCE SYMBOLS

1 Filling machine
2 Pack
3,4 Stack
5,6 Packaging blank
7 Mandrel wheel
8 Mandrel
9 Press
10 Supply device
11 Transfer position
12 Cell
13 Transport equipment
15 Aseptic chamber
16 Sterilization zone
17 Filling and closing zone
18 Aseptic zone
19 Collection tray
20 Sterile air connections
21 Preheating device
22 Sterilization device
23 Drying device
24 Filling position
25 Filling outlet
26 Filling device
27 Closing device
28 Removal position
30 Cell chain
31 Cell bar
32 Cleaning device
33 Pipe section
34,35 Nozzle
36 Swivel device
37 Hose
38 Supply line
39 Plug-in fastener
40 Cams
41 Nut
42 Quick-release fastener
43 Locking bolt
R Series
T Transport direction

The invention claimed is:

1. A cleaning method for cleaning a filling machine for filling at least to one side open packs with products, wherein the filling machine has a transport device for transporting the at least to one side open packs by means of the filling machine, in which a first plurality of at least to one side open packs is transported at least partially through the filling machine by a transport device and the first plurality of at least to one side open packs is filled by at least one filling outlet while being transported at least partially through the filling machine, in which a cleaning device having at least one nozzle for dispensing cleaning medium is transported at least partially through the filling machine by the transport device and the cleaning device dispenses cleaning medium for cleaning the filling machine while being transported at least partially through the filling machine, in which, after the cleaning of the filling machine, a second plurality of at least to one side open packs is transported at least partially through the filling machine by means of the transport device and the second plurality of at least to one side open packs is filled by the at least one filling outlet while being transported at least partially through the filling machine, and in which, after the first plurality of at least to one side open packs are filled, the cleaning device is connected to the transport device and/or a supply line and/or in which the cleaning device is separated from the transport device and/or the supply line after the cleaning medium has been dispensed in the filling machine.

2. The cleaning method according to claim 1, in which after separation of the cleaning device from the transport device and/or the supply line, the second plurality of at least to one side open packs is transported at least partially through the filling machine by the transport device and the second plurality of at least to one side open packs is filled by the at least one filling outlet while being transported at least partially through the filling machine.

3. The cleaning method according to claim 1, in which the first plurality and/or the second plurality of at least to one side open packs is heated in the filling machine in a heating zone, sterilized in a sterilization zone, dried in a drying zone, filled in a filling zone and/or closed in a closing zone, and in which cleaning medium for cleaning the filling machine is dispensed in the heating zone, the sterilization zone, the drying zone, the filling zone and/or the closing zone.

4. The cleaning method according to claim 1, in which heating of at least to one side open packs takes place with at least one hot air nozzle, sterilization of at least to one side open packs with at least one sterilizing agent nozzle, drying of at least to one side open packs with at least one hot air nozzle, filling of at least to one side open packs with at least one filling outlet and/or closing of at least to one side open packs with at least one ultrasonic sealing device, and in which the at least one hot air nozzle, the sterilization nozzle, the filling outlet and/or the ultrasonic closing device is acted upon by the cleaning device and thus cleaned.

5. The cleaning method according to claim 1, in which the first plurality and/or the second plurality of at least to one side open packs are transported by means of the transport device at least partially through the filling machine in a plurality of rows (R) arranged next to one another and the first plurality and/or the second plurality of at least to one side open packs are filled by the at least one filling outlet while being transported at least partially through the filling machine.

6. The cleaning method according to claim 1, in which the first plurality and/or the second plurality of at least to one side open packs are transported at least partially in cells of a cell chain through the filling machine, and in which the cells are provided in rows (R) which are arranged one behind another in a direction transverse to a direction (T) the cells are transported in, and in which the rows (R) of cells are at least partially interconnected to form a common cell bar.

7. The cleaning method according to claim 6, in which the cleaning device is connected to at least one cell and/or to at least one row of cells before use and is detached from the at least one cell and/or from the at least one row of cells after use, or in which, before the cleaning device is used, at least one cell and/or at least one row of cells is removed and replaced by the cleaning device and, after the cleaning device is used, the cleaning device is removed and replaced by at least one cell and/or at least one row of cells.

8. The cleaning method according to claim 6, in which the cleaning device extends from one outer cell of one of the rows (R) of cells to the opposite outer cell of said row (R) of cells or extends from one of the rows (R) of cells to an opposite one of the rows (R) of cells.

9. The cleaning method according to claim 1, in which the cleaning device for cleaning the filling machine is transported by the transport device at least once in a direction (T) used when filling the at least to one side open packs and against the direction (T) used when filling the at least to one side open packs and/or in which the cleaning device is connected to the transport device and is pivoted about a longitudinal axis of the cleaning device at at least one location within the filling machine for cleaning the filling machine.

10. The cleaning method according to claim 1, in which the cleaning device dispenses cleaning medium upwards, sideways and/or downwards for cleaning the filling machine and/or in which the cleaning device dispenses cleaning medium through at least two nozzles for cleaning the filling machine.

11. The cleaning method according to claim 1, in which water and/or water mixed with a cleaning agent is used as the cleaning medium.

12. The cleaning method according to claim 1, in which, after separating the cleaning device from the transport device and before filling the second plurality of at least to one side open packs in the filling machine, the filling machine is dried at least partially and/or in sections by blowing in air.

13. The cleaning method according to claim 1, in which the first plurality and/or the second plurality of at least to one side open packs are transported at least partially in cells of a cell chain through the filling machine.

14. The cleaning method according to claim 1, in which the cleaning device is connected to at least one cell and/or to at least one row of cells before use and is detached from the at least one cell and/or from the at least one row of cells after use, or in which, before the cleaning device is used, at least one cell and/or at least one row of cells is removed and replaced by the cleaning device and, after the cleaning device is used, the cleaning device is removed and replaced by at least one cell and/or at least one row of cells.

15. The cleaning method according to claim 14, in which the cleaning device extends from an outer cell of a row (R) of cells and/or a row of cells to an opposite outer cell of a row (R) of cells and/or an opposite row of cells.

16. The cleaning method according to claim 1, in which water and/or water mixed with a cleaning agent is used as the cleaning medium, and in which the water and/or the water mixed with the cleaning agent, are used alternately at least once.

17. The cleaning method according to claim 1, in which, after separating the cleaning device from the transport device and before filling the second plurality of at least to one side open packs in the filling machine, the filling machine is dried at least partially and/or in sections by blowing in hot air, and in which the hot air is blown in through the at least one nozzle of the cleaning device.

* * * * *